US010504135B2

(12) United States Patent
Boggs et al.

(10) Patent No.: US 10,504,135 B2
(45) Date of Patent: Dec. 10, 2019

(54) TECHNOLOGIES FOR INSERTING DYNAMIC CONTENT INTO PODCAST EPISODES

(71) Applicant: Apple Inc., Cupertino, CA (US)

(72) Inventors: James O. Boggs, San Francisco, CA (US); Ryan Griggs, Palo Alto, CA (US); Sam Gharabally, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 401 days.

(21) Appl. No.: 14/162,595

(22) Filed: Jan. 23, 2014

(65) Prior Publication Data

US 2015/0206168 A1 Jul. 23, 2015

(51) Int. Cl.
*G06Q 30/00* (2012.01)
*G06Q 30/02* (2012.01)
*H04N 21/234* (2011.01)
*H04N 21/81* (2011.01)
*H04N 21/233* (2011.01)

(52) U.S. Cl.
CPC ....... *G06Q 30/0241* (2013.01); *H04N 21/233* (2013.01); *H04N 21/23418* (2013.01); *H04N 21/23424* (2013.01); *H04N 21/812* (2013.01)

(58) Field of Classification Search
CPC ................................................ G06Q 30/0241
See application file for complete search history.

(56) References Cited

U.S. PATENT DOCUMENTS

| 7,992,165 | B1 | 8/2011 | Ludewig et al. | |
|---|---|---|---|---|
| 2002/0092019 | A1* | 7/2002 | Marcus | G11B 27/034 725/37 |
| 2006/0167749 | A1* | 7/2006 | Pitkow | G06Q 30/02 705/14.61 |
| 2007/0078712 | A1 | 4/2007 | Ott, IV et al. | |
| 2007/0078713 | A1* | 4/2007 | Ottt, IV | G06Q 30/02 705/14.61 |
| 2008/0010117 | A1 | 1/2008 | Oliveira et al. | |
| 2008/0134236 | A1* | 6/2008 | Iijima | H04H 20/28 725/34 |
| 2008/0255686 | A1 | 10/2008 | Irvin et al. | |
| 2010/0057576 | A1* | 3/2010 | Brodersen | G06Q 30/0273 705/14.69 |
| 2010/0131355 | A1* | 5/2010 | Kitchen | G06Q 30/02 705/14.43 |

(Continued)

*Primary Examiner* — Bennett M Sigmond
*Assistant Examiner* — Scott C Anderson
(74) *Attorney, Agent, or Firm* — Polsinelli PC (57) ABSTRACT

Systems, methods, and computer-readable storage media for inserting dynamic content into podcast episodes. The system first detects a playback of a podcast episode, the podcast episode including at least one media item. Next, the system identifies a content insertion point in the podcast episode for inserting a content item into the podcast episode during the playback of the podcast episode. The system then dynamically inserts the content item into the content insertion point in the podcast episode during the playback of the podcast episode, wherein the podcast episode is configured to pause playback of the podcast episode and initiate playback of the content item when the playback of the podcast episode reaches a playback position associated with the content insertion point.

11 Claims, 5 Drawing Sheets

(56) References Cited

U.S. PATENT DOCUMENTS

2011/0126107 A1* 5/2011 Barton ................ G11B 27/034
715/723
2013/0067510 A1 3/2013 Ahanger et al.
2014/0344852 A1* 11/2014 Reisner ............. H04N 21/2668
725/32

* cited by examiner

TECHNOLOGIES FOR INSERTING DYNAMIC CONTENT INTO PODCAST EPISODES

TECHNICAL FIELD

The present technology pertains to podcasts, and more specifically pertains to dynamically providing invitational content in podcasts.

BACKGROUND

Podcasts are an increasingly popular medium for distributing convent over the Internet. In particular, podcasts are media content items, typically provided in episodic format, prepared for users to download or stream from their own media device. Generally, podcasts are available from provider websites, and provided to users or subscribers as Really Simple Syndication (RSS) feeds with audio and video files itemized as enclosures or episodes. Users or subscribers can stream or download these RSS feeds from one or more media devices equipped to provide corresponding audio and video output to the user.

The media content in podcasts is typically predefined when the podcast is created. Not surprisingly, podcasts currently provide little flexibility for updating or dynamically adapting media content to the user. Consequently, providers and distributors lack the ability and flexibility to provide targeted and updated advertisements to users and subscribers within the podcast content.

Yet digital advertisement can be an extremely effective way for advertisers to reach a wide mass of potential customers and induce numerous users to purchase their products. By targeting users with effective digital advertisements, advertisers can yield large financial returns from their digital advertisements. Unfortunately, current podcast solutions greatly limit providers and distributors in their ability to fully benefit from the combined widespread popularity of podcasts and the economic advantages of digital advertisements.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to insert dynamic advertisements (Ads) into remotely hosted RSS feeds having audio and/or video content. Such dynamic Ad placement can allow providers to benefit from the revenue created by inserting Ad content, such as HTML-based Ad content, into the client playback of episodes listed in the RSS feed the provider has created. The client can automatically refresh Ad inventory in the background when the device has network connectivity to maintain the content new, refreshed, and targeted. Playcount information can be collected and synchronized to the directory system storing the podcast items to keep track of Ad statistics and target the delivery of Ads and content through podcast episodes.

Disclosed are systems, methods, and non-transitory computer-readable storage media for determining inserting dynamic content, such as Ads, into podcast episodes. The system first detects a playback of a podcast episode, the podcast episode including at least one media item. The podcast episode can be, for example, an RSS feed with one or more audio or video files. The playback of the podcast episode can be initiated at a client device, such as a smartphone, in response (or after) a request from a user to download or stream the podcast episode.

Next, the system identifies a content insertion point in the podcast episode for inserting a content item into the podcast episode during the playback of the podcast episode. The content insertion point can be a break time selected for the podcast episode. In some cases, the break time can be indicated by a tag associated with the podcast episode. For example, the system or the podcast generator can associate a break tag with the podcast episode. The break tag can indicate one or more break start and/or end times in the podcast episode. In some cases, a podcast episode can include multiple break tags indicating various break times for inserting content items. Moreover, the podcast episode can be partitioned into podcast segments divided by breaks for playing content items inserted into the podcast episodes during playback or download/streaming.

The system then inserts the content item into the content insertion point in the podcast episode during the playback of the podcast episode, wherein the podcast episode is configured to pause playback of the podcast episode and initiate playback of the content item when the playback of the podcast episode reaches a playback position associated with the content insertion point. The podcast episode can also be configured to resume playback after a playback of the content item finishes. For example, the podcast episode can be configured to initiate playback of the podcast episode, pause the podcast episode when the playback reaches a break time (e.g., the content insertion point), initiate playback of the content item after the podcast episode is paused, and resume the podcast episode after the content item has finished playing or at the end of the break time.

In some embodiments, the content item can include invitational content, such as an advertisement. The invitational content can be selected by a content delivery system, such as an Ad system, for example. Moreover, the invitational content can be selected based on a user, a group, a recipient, a segment, a behavior, a context, a profile, the podcast episode, a schedule, content, and/or any other content targeting strategy. In some cases, the invitational content can be selected or inserted dynamically as the podcast episode is played, downloaded, or streamed. Further, the system can receive a playcount of one or more content items after a playback of the one or more content items. This way, the system can maintain statistics or information regarding the playback or consumption of one or more content items throughout the podcast episode. The system can also collect playcount information for multiple podcast episodes and multiple users or devices. For example, the system can collect playcount information for a specific advertisement inserted into a podcast episode downloaded or streamed by multiple users or devices.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for dynamic content in podcasts. Disclosed are systems, methods, and non-transitory computer-readable storage media for inserting dynamic content into podcast episodes. A brief introductory description of an exemplary configuration of devices and a network is disclosed herein. A detailed description of inserting dynamic content into podcasts, and exemplary variations will then follow. These variations shall be described herein as the various embodiments are set forth. The disclosure now turns to FIG. 1.

Figure 1:
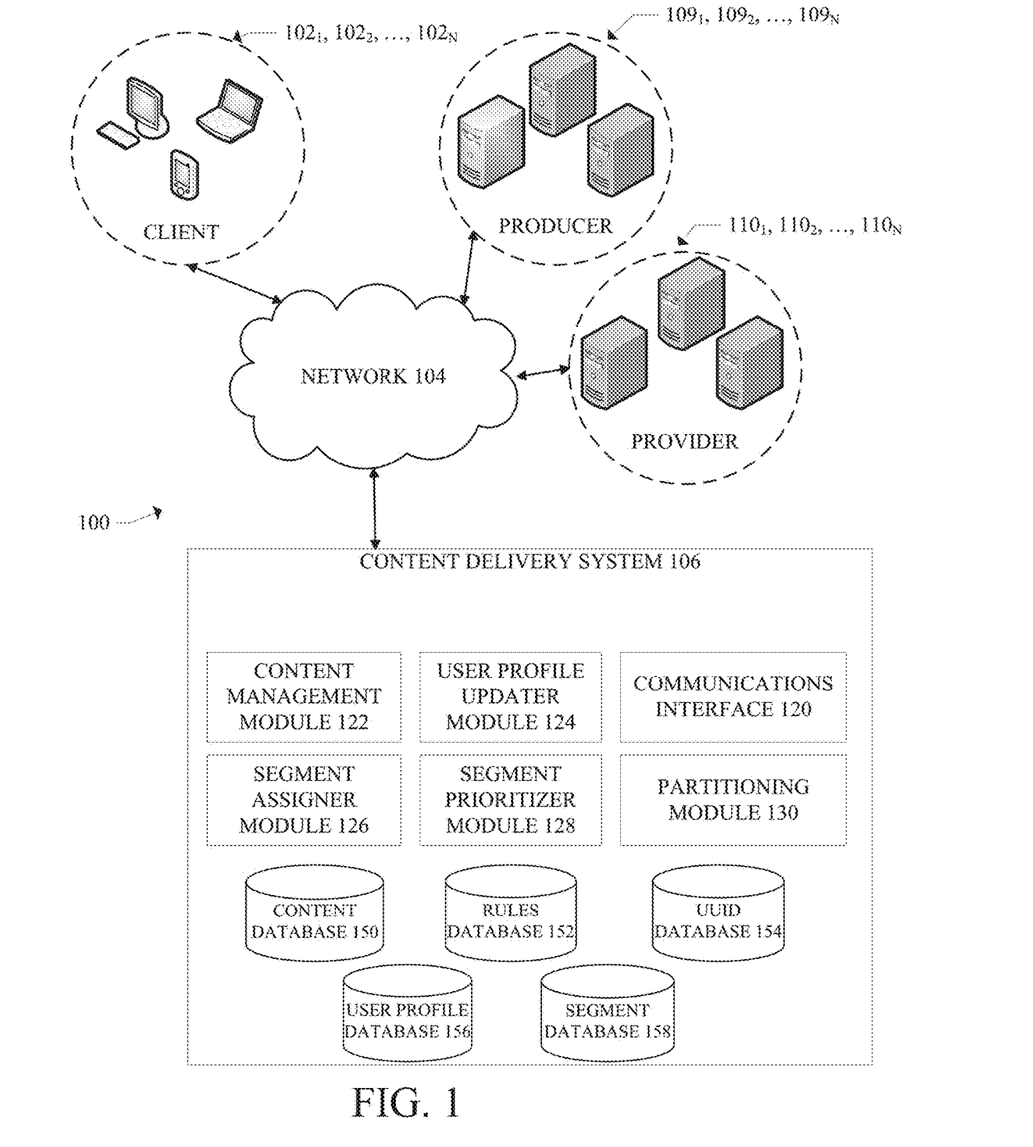
FIG. 1 illustrates an exemplary configuration of devices and a network.

An exemplary system configuration 100 is illustrated in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, invitational content can be delivered to user terminals $102_1$, $102_2$, ..., $102_n$ (collectively "102") connected to a network 104 by direct and/or indirect communications with a content delivery system 106. User terminals 102 can be any network enabled client devices, such as desktop computers; mobile computers; handheld communications devices, e.g. mobile phones, smart phones, tablets; smart televisions; set-top boxes; and/or any other network enabled computing devices. Furthermore, content delivery system 106 can concurrently accept connections from and interact with multiple user terminals 102. In some embodiments, the user terminals 102 can correspond to the client 308 in FIG. 3.

The content delivery system 106 can receive a request for electronic content, such as a web page, an application, a media item, etc., from one of user terminals 102. Thereafter, the content delivery system 106 can assemble a content package and transmit the assembled content page to the requesting one of user terminals 102. To facilitate communications with the user terminals 102 and/or any other device or component, the content delivery system 106 can include a communications interface 120.

The content delivery system 106 can include a content management module 122 to facilitate the generation of an assembled content package. Specifically, the content management module 122 can combine content from one or more primary content providers $109_1$, $109_2$, ..., $109_n$ (collectively "109") and content from one or more secondary content providers $110_1$, $110_2$, ..., $110_n$ (collectively "110") to generate the assembled content package for the user terminals 102. For example, in the case of a web page being delivered to a requesting one of user terminals 102, the content management module 122 can assemble a content package by requesting the data for the web page from one of the primary content providers 109 maintaining the web page. For the invitational content on the web page provided by the secondary content providers 110, the content management module 122 can request the appropriate data according to the arrangement between the primary and secondary content providers 109 and 110. Additionally, the content management module 122 can create content packages that contain content from a single content provider. That is, a content package can contain only primary content or a content package can contain only secondary content. However, the content package is not limited to the content from content providers 109 and 110. Rather, the content package can include other data generated at the content delivery system 106. In some embodiments, the content delivery system 106 can preselect the content package before a request is received.

Figure 3:
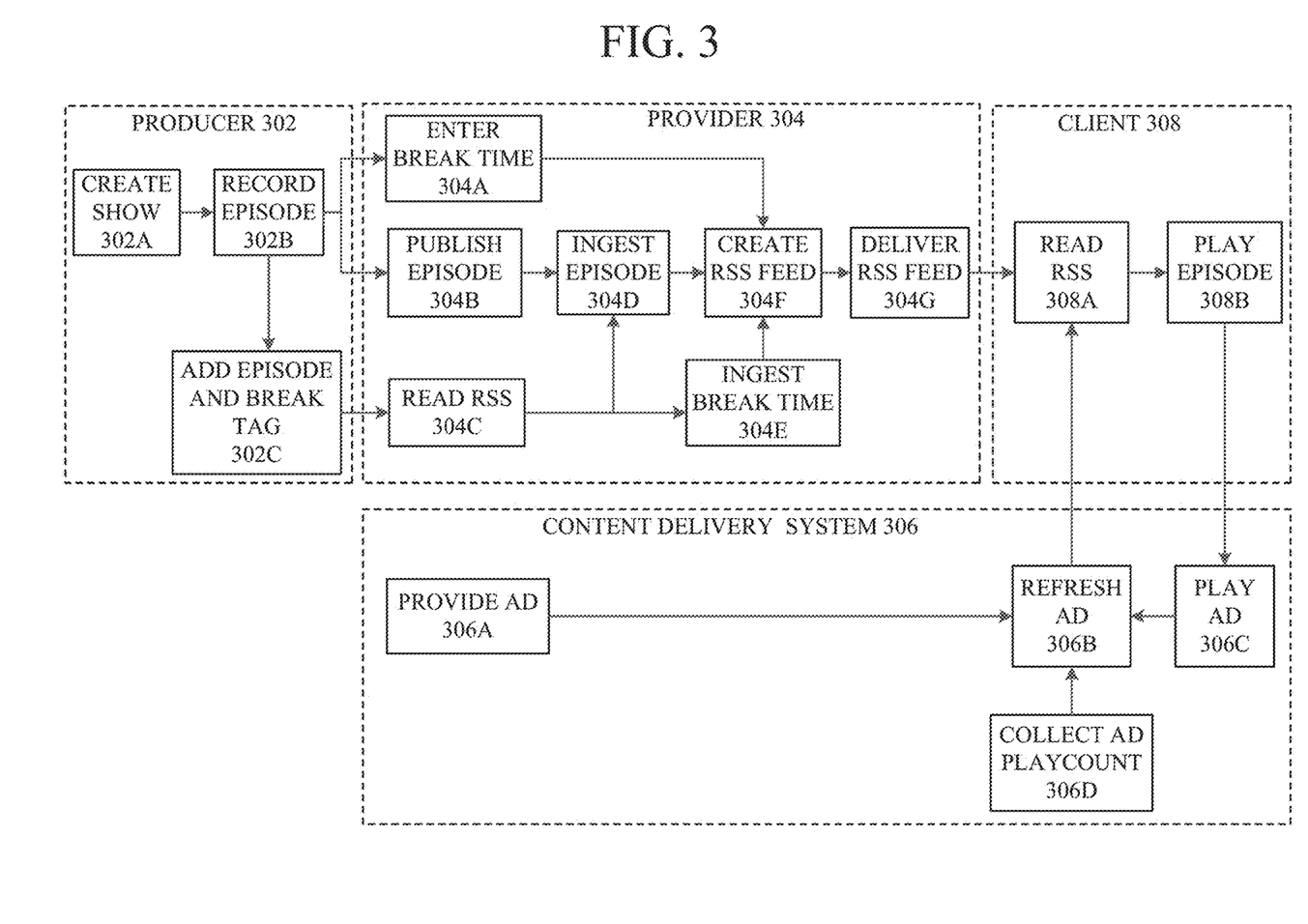
FIG. 3 illustrates an exemplary system for inserting content into a podcast.

In some cases, the primary provider 109 can be a producer of content, such as producer 302 in FIG. 3, and the secondary provider 110 can be a provider of content, such as provider 304 in FIG. 3. Here, the producer 109 can produce or create the content, and send the content to the provider 110 to serve or provide the content to the client 102.

An assembled content package can include text, graphics, audio, video, executable code, or any combination thereof. Further, an assembled content package can include invitational content designed to inform or elicit a pre-defined response from the user. In some embodiments, the invitational content can be associated with a product or can directly or indirectly advertise a product. For example, the assembled content package can include one or more types of advertisements from one or more advertisers.

Additionally, the invitational content can be active invitational content. That is, invitational content that is designed to primarily elicit a pre-defined response from a user. For example, active invitational content can include one or more types of advertisements configured to be clicked upon, solicit information, or be converted by the user into a further action, such as a purchase or a download of the advertised item. However, invitational content can also be passive invitational content. That is invitational content that is designed to primarily inform the user, such as a video. In some cases, passive invitational content can include information that can lead or direct users to other invitational content including active invitational content.

Furthermore, the invitational content can be dynamic invitational content. That is invitational content that varies over time or that varies based on user interaction. For example, dynamic invitational content can include an interactive game. However, the various embodiments are not limited in this regard and the invitational content can include static invitational content that neither varies over time nor with user interaction. In the various embodiments, invitational content in a content package can be static or dynamic and active or passive. A content package can include a combination of various types of invitational content in a single content package.

In some cases, a content package can replace or update invitational content in a content package already delivered to a user terminal. For example, a first content package can include an app that can be installed on the user terminal $102_i$. A subsequent content package can include one or more items of invitational content that can be presented to a user of the user terminal 102, while the user interacts with the app.

Although primary and secondary providers 109 and 110 are presented herein as separate entities, this is for illustrative purposes only. In some cases, the primary and the secondary content providers 109 and 110 can be the same entity. Thus, a single entity can provide both the primary and the secondary content.

The content management module 122 can be configured to request that content be sent directly from content providers 109 and 110. Alternatively, a cached arrangement can also be used to improve performance of the content delivery system 106 and improve overall user experience. That is, the content delivery system 106 can include a content database 150 for locally storing/caching content maintained by content providers 109 and 110. The data in the content database 150 can be refreshed or updated on a regular basis to ensure that the content in the database 150 is up to date at the time of a request from a user terminal $102_i$. However, in some cases, the content management module 122 can be configured to retrieve content directly from content providers 109 and 110 if the metadata associated with the data in the content database 150 appears to be outdated or corrupted.

As described above, content maintained by the content providers 109 and 110 can be combined according to a predefined arrangement between the two content providers, which can be embodied as a set of rules. In an arrangement where the content delivery system 106 assembles the content package from multiple content providers, the assembly rules can be stored in a rules database 152 in the content delivery system 106. The content management module 122 can be configured to assemble the content package for user terminals 102 based on these rules. The rules can specify how to select content from secondary content providers 110 and primary content providers 109 in response to a request from one of user terminals 102. For example, in the case of a web page maintained by one of primary content providers 109 and including invitational content, the rules database 152 can specify rules for selecting one of the secondary providers 110. The rules can also specify how to select specific content from the selected one of secondary providers 110 to be combined with the content provided by one of primary providers 109. In some cases, an item of primary content, such as an app or other media object, can have one or more associated attributes. For example, an app can have one or more associated genre attributes, e.g. travel, sports, education, etc. A rule can be based at least in part on the primary content attributes. Once assembled, the assembled content package can be sent to a requesting one of user terminals 102.

Additionally, rules for combining primary and secondary content can be based on user characteristics known about the user. In particular, in some cases, invitational content can be selected based on the characteristics of the requesting user (s). As used herein, the term "user characteristics" refers to the characteristics of a particular user associated with one or more of user terminals 102. User characteristics can include channel characteristics, demographic characteristics, behavioral characteristics, and spatial-temporal characteristics.

Channel characteristics can define the specific delivery channel being used to deliver a content package to a user. For example, channel characteristics can include a type of electronic content, a type of device or user terminal, a carrier or network provider, or any other characteristic that defines a specific delivery channel for the content package. Spatial-temporal characteristics can define a location, a location zone, a date, a time, or any other characteristic that defines a geographic location and/or a time for delivery of the content package. Demographic characteristics can define characteristics of the users targeted by the content or associated with the content. For example, demographic characteristics can include age, income, ethnicity, gender, occupation, or any other user characteristics. Behavioral characteristics can define user behaviors for one or more different types of content, separately or in combination with any other user characteristics. That is, different behavioral characteristics may be associated with different channel, demographic, or spatial-temporal characteristics. User characteristics can also include characteristics descriptive of a user's state of mind including characteristics indicative of how likely a user is to click on or convert an item of invitational content if it were displayed to the user. User characteristics can be learned directly or derived indirectly from a variety of sources. In some embodiments, the user characteristic values can be collected from one or more databases. For example, if the user is registered with an online media service, such as the ITUNES store maintained by Apple Inc. of Cupertino, Calif., the collected data could include the user's registration information. Such data can provide values for declared user characteristics. Furthermore, the content delivery system 106 can be configured to learn of or derive user characteristics from any number of other information sources. For example, in some configurations, the content delivery system 106 can derive or infer one or more user characteristic values from user characteristic values already known about the user.

In some embodiments, the interactive content can be associated with one or more targeted segments. A targeted segment can be viewed as defining a space or region in k-dimensional space, where each of the k dimensions is associated with one of a plurality of user characteristics. In the various embodiments, the k dimensions can include both orthogonal and non-orthogonal dimensions. That is, some of the k dimensions can overlap or can be related in some aspect.

In the various embodiments, the content delivery system 106 can also include a unique user identifier (UUID) database 154 that can be used for managing sessions with the various user terminal devices 102. The UUID database 154 can be used with a variety of session management techniques. For example, the content delivery system 106 can implement an HTTP cookie or any other conventional session management method (e.g., IP address tracking, URL query strings, hidden form fields, window name tracking, authentication methods, and local shared objects) for user terminals 102 connected to content delivery system 106 via a substantially persistent network session. However, other methods can be used as well. For example, in the case of handheld communications devices, e.g. mobile phones, smart phones, tablets, or other types of user terminals connecting using multiple or non-persistent network sessions, multiple requests for content from such devices may be assigned to a same entry in the UUID database 154. The content delivery system 106 can analyze the attributes of requesting devices to determine whether such requests can be attributed to the same device. Such attributes can include device or group-specific attributes.

In some embodiments, the content delivery system 106 can include a user-profile database 156. The user-profile database 156 can, at least in part, be constructed based on declared user characteristics related to one or more users. In some cases, the user-profile database may contain inferred or derived user characteristic values. The user-profile database 156 can be updated using a user-profile-updater module 124. In some embodiments, the user-profile-updater module 124 can be configured to add additional profile data, update profile data, fill in missing profile data, or infer user characteristic values from declared data.

The user-profile-updater module 124 can also be configured to maintain the user profile database 156 to include only more recently acquired data or to re-derive any inferred characteristics in order to ensure that the user profile is an accurate reflection of the current state of the user (location, state of mind, behaviors, demographics, etc. can change rapidly). For example, the user-profile-updater module 124 can be configured to maintain the user profile database 156 to include only data from the last two to three months. However, the user-profile-updater module 124 can be configured to adjust the data in the user profile database 156 to cover any span of time. In some instances the user-profile-updater module 124 can update the profile database 156 in real-time. Alternatively, the user-profile-updater module 124 can be configured to set an expiration period on a subset of the data in the user profile database 156. For example, a policy can specify that user declared data is maintained as long as the user account is active, but user characteristic values based on location information expire after a specified period of time. In some cases, a user can set the expiration period. In some instances, the user-profile-updater module 124 can update the user profile database 156 at least every week, or every day. In some cases, the content delivery system 106 can receive a direct request to update one or more user profiles. The update request can come directly from the user's device or any other device capable of communicating with the content delivery system 106, such as other content delivery networks or websites. In some cases, the content delivery system 106 can receive an indirect request to update one or more user profiles. An indirect request can be the result of receiving new user characteristic values. An update request can occur at any time.

In some embodiments, the content delivery system 106 can include a segment database 158 that is used to aid in selecting invitational content to target to users. The segment database 158 can store defined segments and associations between the segments and users and/or invitational content that should be targeted to users associated with the segments. As described above, a targeted segment can be defined based on one or more user characteristics or derivatives thereof and can be associated with one or more items of invitational content. Additionally, a targeted segment can be associated with one or more users. In some embodiments, by associating a targeted segment with both a user and an item of invitational content, the delivery system can match invitational content with users. In some embodiments, the content delivery system 106 can update the segment database 158 to add newly defined targeted segments or to delete targeted segments.

In some cases a targeted segment can be as simple as a single user characteristic identifier and a single user characteristic value. For example, the common demographic identifiers of gender, age, occupation, or income can each be used in defining corresponding targeted segments. A characteristic value can also be assigned to the identifier. For example, the values of male, 19, and student can be assigned to the user characteristics of gender, age, and occupation, respectively. However, more complex targeted segments can also be defined that consist of one or more identifiers with one or more values associated with each identifier. For example, a targeted segment can be defined to target a user with the following characteristics: gender, male; age, 19-24; location, Northern California or New York City. Additional exemplary segments are described throughout this disclosure. Furthermore, targeted segments can correspond to one or more segments that content providers are likely to easily understand and thus can quickly identify as being relevant to their content. Additionally, in some embodiments, content providers 109 and 110 can define a custom targeted segment.

In some embodiments, the content delivery system 106 can provide a segment assigner module 126. The segment assigner module 126 can apply a set of user characteristics associated with a user (including segments to which a user has been previously assigned) to assign the user to one or more targeted segments. The assigner module 126 can obtain the set of user characteristic values from the user profile database 154 and/or from the user's activities during the current session. The segment assigner module 126 can assign a user to one or more defined targeted segments in the segment database 158, or alternatively, a user can be assigned to a custom targeted segment defined to meet specific goals of a content provider.

Based on the assigned segments, the user profile database 156 can be updated to reflect the segment assignments. Additionally, the content delivery system 106 can use the segment assignments to select targeted content. In some cases, the user profile data in the user profile database 156 can change over time so the segment assigner module 126 can be configured to periodically update the segment assignments in the user profile database 156. The segment assignment update can be triggered at specified intervals, upon detection of a change in the user profile database 156, and/or upon detection of a specified activity in the content delivery system 106.

In some embodiments, the content delivery system 106 can provide a prioritizer module 128. The prioritizer module 128 can perform a variety of prioritizing tasks based on the configuration of the content delivery system 106. In some configurations, the prioritizer module 128 can prioritize the targeted segments assigned to a user. The prioritization can be influenced by a number of factors, which can include the user's context, a content provider's campaign goals, and/or the content that is currently available for display to the user. A request to prioritize the targeted segments can be explicit or implicit and can be made by any component of the system 100. For example, a secondary content provider 110 can explicitly request that the content delivery system 106 prioritize the targeted segments or the request can be implicit as part of a request for a content package. The resulting prioritized list can be provided, for example, to the content management module 122, which can then use the information to assemble and deliver a content package. Additionally, the prioritized list can be stored, for example in the user profile, for later use.

In some embodiments, the content delivery system 106 can include a partitioning module 130. The partitioning module 130 can perform partitioning tasks based on the configuration of the content delivery system 106. In some configurations, the partitioning module 130 can divide content, such as a presentation of content, or a user session into partitions of time or content. While FIG. 1 illustrates the partitioning module 130 as a component of the content delivery system 106, one of ordinary skill in the art will readily recognize that the partitioning module 130 can be separate from the content delivery system 106. For example, in some cases, the partitioning module 130 can be a component of content provider 109$_i$, content provider 110$_i$, user terminal 102$_i$, or any other server or client device.

While the content delivery system 106 is presented with specific components, it should be understood by one skilled in the art, that the architectural configuration of system 106 is simply one possible configuration and that other configurations with more or less components are also possible.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

Figure 2A:
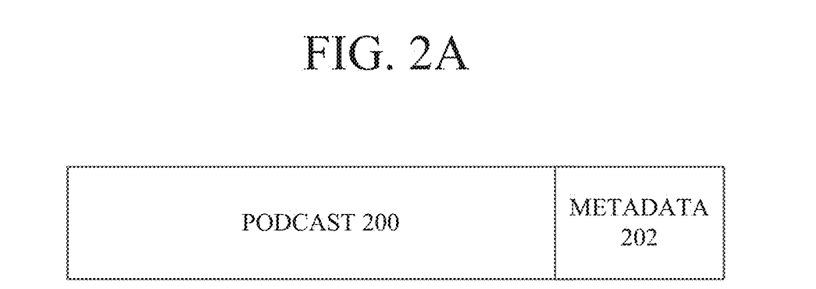
FIGS. 2A-C illustrate exemplary podcast content.

The disclosure now turns to FIG. 2A, which illustrates a first exemplary configuration of a podcast. The podcast can include podcast content 200, which can include one or more media items, such as audio, video, text, or any other media content.

The podcast content 200 can represent one or more files in an RSS feed from a provider. In some cases, the podcast 200 can include one or more episodes or segments. Each episode or segment can be based on an audio file, a video file, a text file, or any other type of media file. For example, podcast content 200 can represent a chapter in an RSS feed or media program. In some cases, the podcast content 200 can represent multiple programs or RSS feeds. However, the podcast content 200 can also represent a program or RSS feed with multiple segments or episodes. For example, the podcast content 200 can represent a sports podcast program, where various portions of the podcast content represent episodes or segments of the sports podcast program. A user can then download or stream to their device the podcast content 200 as separate episodes or chapters, for example.

The podcast can also include metadata 202. The metadata 202 can be bundled with the podcast content 200 or included as part of the podcast. The metadata 202 can include specific information associated with the podcast, such as a title, a description, an artist, a chapter number, comments, statistics, a location, user-generated information, tags, etc. The metadata 202 can also include break information. For example, the metadata 202 can include break tags indicating start times for added or external content, such as advertisements. The metadata 202 can include tags indicating a location for inserting content. For example, the metadata 202 can include tags indicating that content should be inserted at 3 and 6 minutes in the playback time of the podcast content 200. The tags can indicate a start time of a break or pause, as well as an end time of the break or pause. For example, the tags can indicate the number of breaks that should be included in the podcast content 200, the start time of each break, the duration of each break, and the end time of each break. The tags can be used to provide breaks in the playback of the podcast content 200 and insert targeted content in the podcast content 200 to be played during the breaks. In some cases, the tags can include data for triggering a pause or break in the playback of the podcast content 200. The tags can also include data for resuming playback of the podcast content 200 after a pause.

Figure 2B:
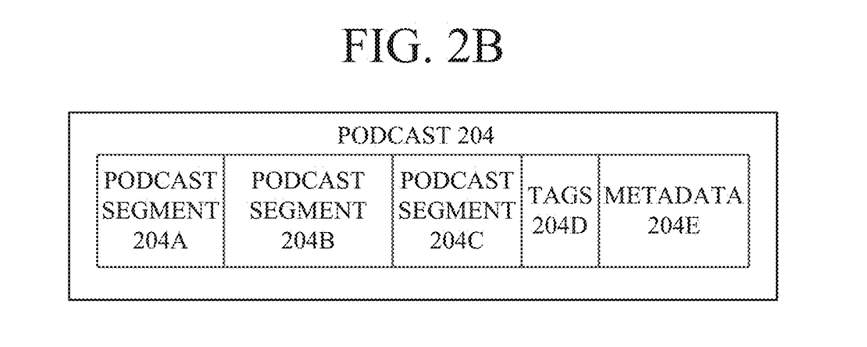

FIG. 2B illustrates a second exemplary podcast 204. Podcast 204 can include podcast segments 204A-C, tags 204D, and metadata 204E. The podcast segments 204A-C can include chapters, episodes, or segments of the podcast 204. For example, each of the podcast segments 204A-C can be a media file corresponding to an episode of the podcast 204. In some cases, the podcast 204 can be divided into podcast segments 204A-C based on various portions of media content in the podcast 204. For example, the media content in the podcast 204 can be divided by topic, category, time, program, artist, etc., to form the podcast segments 204A-C.

The tags 204D can include break tags associated with playback breaks. In some cases, the tags 204D can be attached to the podcast segments 204A-C at corresponding locations associated with the respective breaks. Moreover, the tags 204D can be stored with the podcast segments 204A-C they are associated with. Alternatively, the tags 204D can be stored separately from the podcast segments 204A-C but otherwise associated or linked with specific segments. In some embodiments, the tags 204D can be part of the metadata 204E. In other embodiments, the tags 204D can be separate from the metadata 204E.

The metadata 204E can include information about the podcast segments 204A-C. For example, the metadata 204E can include a description, a title, comments, podcast details, chapter information, ratings, playback settings, configuration information, formatting, file information, networking information, etc. The metadata 204E can also include details regarding break information. For example, the metadata 204E can include start or end times for breaks, break durations, break options, links to content for playback during a break, break configuration settings, break parameters, etc. In some cases, the metadata 204E can include details or descriptors associated with the tags 204D. For example, the metadata 204E can include pointers to the tags 204D or location information associated with the tags 204D. Thus, the metadata 204E can identify the tags 204 and provide information regarding the location of the tags 204D within the podcast 204.

Figure 2C:
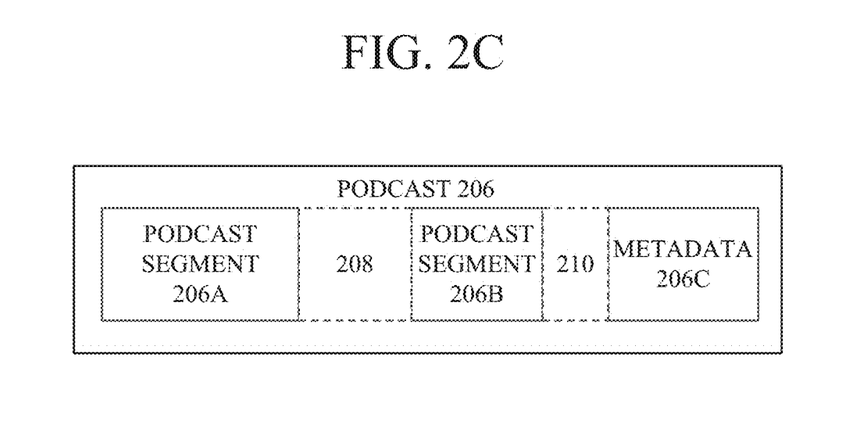

FIG. 3 illustrates a third exemplary podcast 206. Podcast 206 can include podcast segments 206A-B with breaks 208-210 inserted between the podcast segments 206A-B. The breaks 208-210 can be inserted at any portion of the podcast 206, such as before a segment, during a segment, after a segment, etc. The breaks 208-210 can refer to periods of playback time available for inserting content. For example, breaks 208-210 can provide an indication of portions of the podcast 206 for inserting advertisements. In addition, podcast 206 can include metadata 206C, which can include information about the podcast 206, information about the breaks 208-210, information about the content to be inserted in the breaks 208-210, user-generated information, statistics, or any other information as previously explained.

FIGS. 2A-C illustrate exemplary configurations of podcasts. These examples are provided for illustration purposes and are non-limiting. As one of ordinary skill in the art will readily recognize, other podcast configurations are possible and contemplated herein.

FIG. 3 illustrates an exemplary system for inserting dynamic content into a podcast episode. The producer 302 first creates the podcast show 302A and records the podcast episode 302B. The producer 302 then adds episode and break tags 302C to the recorded episode. The producer 302 then sends the recorded episode and the tags to the publisher 304.

The publisher 304 publishes the episode 304B and enters the break time 304A for the episode. The episode can be published as an RSS feed with one or more audio and video files. Moreover, the publisher 304 can read the RSS feed 304C from the producer 302 and ingest the episode 304D and ingest the break time 304E from the break tag. The publisher 304 can then create an RSS feed 304D based on the episode and the tags received from the producer 302. The RSS feed can include breaks or break tags for inserting content into the RSS feed, as further detailed below.

The publisher 304 can then deliver the RSS feed 304G to a client 308. Here, the publisher 304 can receive a request from the client 308 to download or stream the RSS feed, and deliver the RSS feed to the client 308 in response to the request. The publisher 304 can deliver the RSS feed via a network, such as a public and a private network, for example. The publisher 304 can host the RSS feed at a server or database configured to provide content to the client 308 for download or streaming. For example, the publisher 304 can be an online store that delivers online content to clients who request the content.

The client 308 receives the RSS feed from the publisher 304, reads the RSS feed 308A and plays the episode 308B for the user. The client 308 can be a mobile device, such as a smartphone or tablet computer, configured to receive the RSS feed and play the requested episode for the user at the device. Here, the client 308 can receive the RSS feed from the publisher 304 and play the RSS feed for the user.

The content delivery system 306 can generate and store invitational content to be provided to the client 308. More specifically, the content delivery system 306 can provide invitational content to be inserted into the RSS feed at specific intervals indicated by the breaks. Thus, the content delivery system 306 can provide the Ad 306A for the RSS feed, and refresh the Ads 306B to be inserted into the RSS feed. The content delivery system 306 can communicate with the client 308 to insert the refreshed Ad into the RSS feed at the appropriate location in the RSS feed. Moreover, the content delivery system 306 can send the Ad to be inserted to the client 308, dynamically as the client 308 reads, receives, or plays the content in the RSS feed. When the client 308 plays the episode from the RSS feed, the content delivery system 306 can then play the Ad 306C during a break in the playback of the episode. For example, the client 308 can play the episode requested by the user and, when the playback reaches a playback location identified as a break, the content delivery system 306 can then play an Ad from the content delivery system 306. Once the Ad is finished playing, the client 308 can then resume playback of the episode if there is any remaining, unplayed portion of the episode following the break.

This way, the content delivery system 306 can dynamically play Ad content during a podcast episode, by inserting the content for playback into one or more portions in the podcast episode that are designated as breaking points. Moreover, the content delivery system 306 can dynamically select specific content for the client 308. Indeed, the content delivery system 306 can provide targeted invitational content to the client 308 based on one or more targeting strategies, as previously discussed in FIG. 1, above.

In addition, the content delivery system 306 can collect Ad playcounts 306D from the client 308 to maintain statistics and performance information regarding the invitational content played to the client 308. For example, the content delivery system 306 can maintain a count of specific items of content that have been consumed by the client 308, as well as specific performance parameters. The information from the Ad playcounts can then be used to maintain statistics, target invitational content, adjust Ad playback durations and timings, score the advertising content, count and value impressions, etc.

Figure 4:
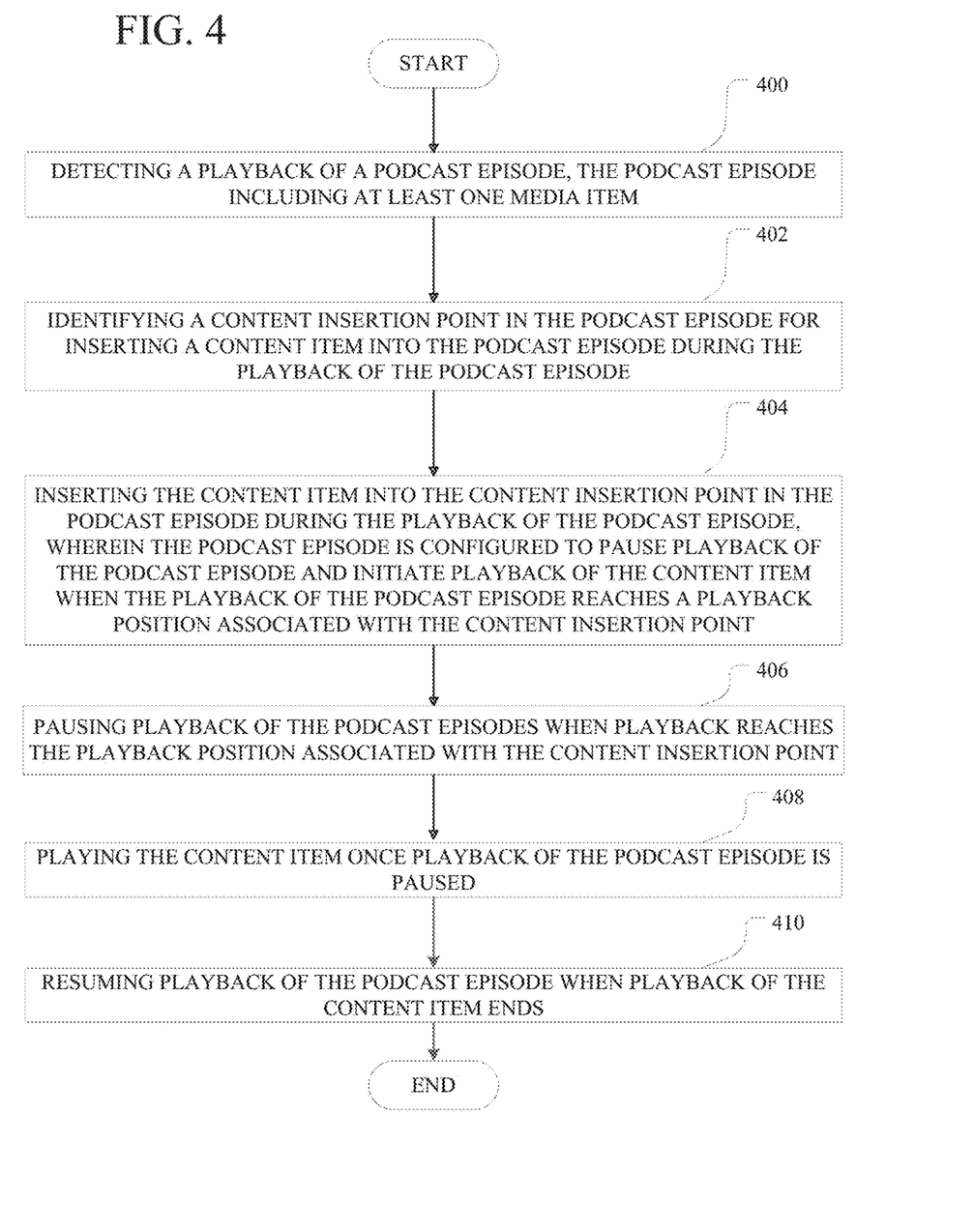
FIG. 4 illustrates an exemplary method embodiment.

Having disclosed some basic system components and concepts, the disclosure now turns to the exemplary method embodiment shown in FIG. 4. For the sake of clarity, the method is described in terms of the components in FIG. 3, configured to practice the method. The steps outlined herein are exemplary and can be implemented in any combination thereof, including combinations that exclude, add, or modify certain steps.

The content delivery system 306 first detects a playback of a podcast episode, the podcast episode including at least one media item (400). The podcast episode can be, for example, an RSS feed with one or more audio or video files. The playback of the podcast episode can be initiated at a client device, such as a smartphone or a tablet computer, in response (or after) a request from a user to download or stream the podcast episode.

Next, the content delivery system 306 identifies a content insertion point in the podcast episode for inserting a content item into the podcast episode during the playback of the podcast episode (402). The content insertion point can be created by the provider 304 based on a break tag received from the producer 302, for example. The content insertion point can be a break time selected for the podcast episode. In some cases, the break time can be indicated by a tag associated with the podcast episode. For example, the producer 302 can associate a break tag with the podcast episode, which can then be translated into an insertion point by the provider 304. The break tag can indicate one or more break start and/or end times in the podcast episode. In some cases, a podcast episode can include multiple break tags indicating various break times for inserting content items. Moreover, the podcast episode can be partitioned into podcast segments divided by breaks for playing content items inserted into the podcast episodes during playback or download/streaming.

The content delivery system 306 then inserts the content item into the content insertion point in the podcast episode during the playback of the podcast episode, wherein the podcast episode is configured to pause playback of the podcast episode and initiate playback of the content item when the playback of the podcast episode reaches a playback position associated with the content insertion point (404). The podcast episode can also be configured to resume playback after a playback of the content item finishes. For example, the podcast episode can be configured to initiate playback of the podcast episode, pause the podcast episode when the playback reaches a break time (e.g., the content insertion point), initiate playback of the content item after the podcast episode is paused, and resume the podcast episode after the content item has finished playing or at the end of the break time.

Next, the client 308 can pause playback of the podcast episode when the playback of the podcast episode reaches the playback position associated with the content insertion point (406). Once the playback of the podcast episode is paused, the client 308 can play the content item (408). The client 308 can then resume playback of the podcast episode when the content item ends (410). The content item can end when the full content of the content item has finished playing or when the playback of the content item is otherwise terminated. However, in some embodiments, the client 308 can be restricted from resuming playback of the podcast episode until the content item finishes playing the entire content of the content item.

In some embodiments, the content item can include invitational content, such as an advertisement. The invitational content can be selected by the content delivery system 306 or another Ad system, for example. Moreover, the invitational content can be selected based on a user, a group, a recipient, a segment, a behavior, a context, a profile, the podcast episode, a schedule, content, and/or any other content targeting strategy. In some cases, the invitational content can be selected or inserted dynamically as the podcast episode is played, downloaded, or streamed. In addition, the content insertion point can be selected and updated dynamically. For example, the content insertion point can be modified or updated even as the client 308 is playing the podcast episode or the content item.

The content delivery system 306 can receive a playcount of one or more content items after a playback of the one or more content items. The content delivery system 306 can receive the playcount from the client 308, for example. This way, the content delivery system 306 can maintain statistics or information regarding the playback or consumption of one or more content items throughout the podcast episode. The content delivery system 306 can also collect playcount information for multiple podcast episodes and multiple users or devices. For example, the content delivery system 306 can collect playcount information for a specific advertisement inserted into a podcast episode downloaded or streamed by multiple users or devices.

Figure 5A:
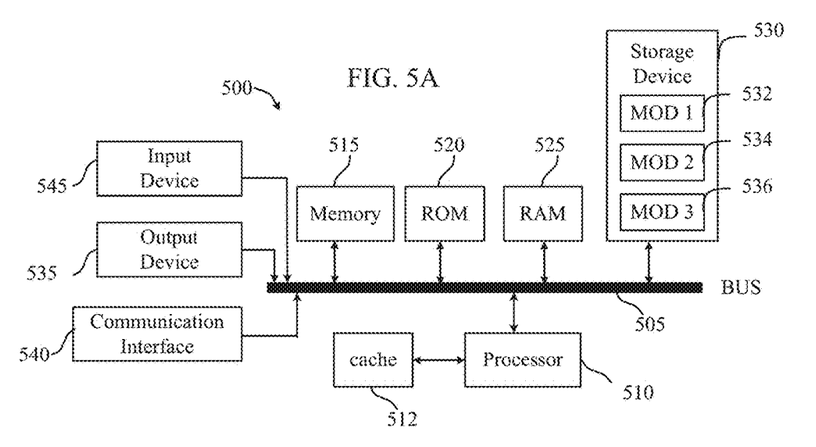
FIG. 5A and FIG. 5B illustrate exemplary system embodiments.
Figure 5B:
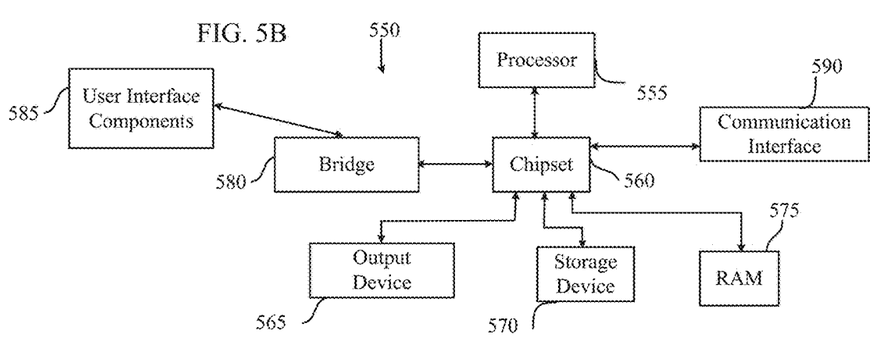

FIG. 5A, and FIG. 5B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 5A illustrates a conventional system bus computing system architecture 500 wherein the components of the system are in electrical communication with each other using a bus 505. Exemplary system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output.

There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B illustrates a computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that exemplary systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Claim language reciting "at least one of" a set indicates that one member of the set or multiple members of the set satisfy the claim. Tangible computer-readable storage media, computer-readable storage devices, or computer-readable memory devices, expressly exclude media such as transitory waves, energy, carrier signals, electromagnetic waves, and signals per se.

We claim:

1. A system comprising:
   a processor; and
   a computer-readable storage medium having stored therein instructions which, when executed by the processor, cause the processor to perform operations comprising:

receiving, from a podcast provider, a podcast episode comprising at least one media item and one or more break tags that each define an available insertion point for a media item within the podcast episode;

inserting the media item in a selected insertion point within the podcast episode;

publishing the podcast episode to a platform for transmitting the podcast episode to a plurality of user devices in a distributed network of user devices;

receiving, from the plurality of user devices in a distributed network of user devices, playcount information for the podcast episode, the playcount information including a number of times the media item was previously inserted into the selected insertion point in the podcast episode and consumed by one or more client devices in the plurality of user devices in the distributed network of client devices;

modifying, based on the playcount information, a selection of the insertion point to define an additional selected insertion point;

transmitting the podcast episode with the additional selected insertion point to an additional client device for playback;

during playback of the podcast episode at the additional client device, dynamically inserting the media item into the additional selected insertion point of the podcast episode when playback of the podcast episode reaches the additional selected insertion point by:

determining segments of the podcast episode, a respective segment of the segments corresponding to the additional selected insertion point; and inserting the media item into the respective segment of the podcast episode.

2. The system of claim 1, wherein the podcast episode is configured to resume playback of the podcast episode by initiating a next podcast segment when the playback position is associated with a portion of the podcast episode that is after the additional selected insertion point.

3. The system of claim 1, wherein the podcast episode comprises a really simple syndication feed with at least one of an audio file and a video file.

4. The system of claim 3, wherein the one or more break tags comprises at least one of a break start time and a break end time.

5. A non-transitory computer-readable storage medium having stored therein instructions which, when executed by a processor, cause the processor to perform operations comprising:

receiving, from a podcast provider, a podcast episode comprising at least one media item and one or more break tags that each define an available insertion point for a media item within the podcast episode;

inserting the media item in a selected insertion point within the podcast episode;

publishing the podcast episode to a platform for transmitting the podcast episode to a plurality of user devices in a distributed network of user devices;

receiving, from the plurality of user devices in a distributed network of user devices, playcount information for the podcast episode, the playcount information including a number of times the media item was previously inserted into the selected insertion point in the podcast episode and consumed by one or more client devices in the plurality of user devices in the distributed network of client devices;

modifying, based on the playcount information, a selection of the insertion point to define an additional selected insertion point;

transmitting the podcast episode with the additional selected insertion point to an additional client device for playback;

during playback of the podcast episode at the additional client device, dynamically inserting the media item into the additional selected insertion point of the podcast episode when playback of the podcast episode reaches the additional selected insertion point by:

determining segments of the podcast episode, a respective segment of the segments corresponding to the additional selected insertion point; and inserting the media item into the respective segment of the podcast episode.

6. The non-transitory computer-readable storage medium of claim 5, wherein the podcast episode is configured to resume playback of the podcast episode by initiating a next podcast segment when a the playback position is associated with a portion of the podcast episode that is after the additional selected insertion point.

7. The non-transitory computer-readable storage medium of claim 6, wherein the podcast episode comprises a really simple syndication feed with at least one of an audio file and a video file.

8. A method comprising:

receiving, from a podcast provider, a podcast episode comprising at least one media item and one or more break tags that each define an available insertion point for a media item within the podcast episode;

inserting the media item in a selected insertion point within the podcast episode;

publishing the podcast episode to a platform for transmitting the podcast episode to a plurality of user devices in a distributed network of user devices;

receiving, from the plurality of user devices in a distributed network of user devices, playcount information for the podcast episode, the playcount information including a number of times the media item was previously inserted into the selected insertion point in the podcast episode and consumed by one or more client devices in the plurality of user devices in the distributed network of client devices;

modifying, based on the playcount information, a selection of the insertion point to define an additional selected insertion point;

transmitting the podcast episode with the additional selected insertion point to an additional client device for playback;

during playback of the podcast episode at the additional client device, dynamically inserting the media item into the additional selected insertion point of the podcast episode when playback of the podcast episode reaches the additional selected insertion point by:

determining segments of the podcast episode, a respective segment of the segments corresponding to the additional selected insertion point; and inserting the media item into the respective segment of the podcast episode.

9. The method of claim 8, wherein the podcast episode is configured to pause playback of the podcast episode and initiate playback of the media item when a playback of the podcast episode reaches a playback position associated with the one or more break tags.

10. The method of claim 8, wherein the one or more break tags specify at least one of a break start time and a break end time.

11. The method of claim 8, wherein the podcast episode is configured to pause based on the one or more break tags.

\* \* \* \* \*